US010370546B2

(12) United States Patent
Shimazaki et al.

(10) Patent No.: US 10,370,546 B2
(45) Date of Patent: Aug. 6, 2019

(54) WATER/OIL-REPELLENT COATING COMPOSITION

(71) Applicant: SUMITOMO CHEMICAL COMPANY, LIMITED, Tokyo (JP)

(72) Inventors: Yasuharu Shimazaki, Osaka (JP); Sayaka Sakurai, Osaka (JP); Tomonori Miyamoto, Osaka (JP); Atsushi Hozumi, Nagoya (JP); Chihiro Urata, Nagoya (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/522,584

(22) PCT Filed: Oct. 27, 2015

(86) PCT No.: PCT/JP2015/080176
§ 371 (c)(1),
(2) Date: Apr. 27, 2017

(87) PCT Pub. No.: WO2016/068103
PCT Pub. Date: May 6, 2016

(65) Prior Publication Data
US 2017/0313902 A1 Nov. 2, 2017

(30) Foreign Application Priority Data
Oct. 31, 2014 (JP) .................. 2014-223649

(51) Int. Cl.
C09D 5/00 (2006.01)
C09D 7/20 (2018.01)
C09D 7/40 (2018.01)
C09D 7/63 (2018.01)
C09D 183/04 (2006.01)
C09D 5/16 (2006.01)
C09D 183/14 (2006.01)
C09D 7/61 (2018.01)
C08G 77/58 (2006.01)

(52) U.S. Cl.
CPC .................. C09D 7/40 (2018.01); C09D 5/00 (2013.01); C09D 5/16 (2013.01); C09D 7/20 (2018.01); C09D 7/61 (2018.01); C09D 7/63 (2018.01); C09D 183/04 (2013.01); C09D 183/14 (2013.01); C08G 77/58 (2013.01)

(58) Field of Classification Search
CPC ........ C09D 183/04; C09D 7/20; C09D 7/763; C09D 5/00
USPC ...................................................... 524/765
See application file for complete search history.

(56) References Cited

U.S. PATENT DOCUMENTS

| 2,397,895 | A | 4/1946 | Warrick |
| 3,450,672 | A | 6/1969 | Merrill |
| 3,634,321 | A | 1/1972 | Nugent et al. |
| 4,322,476 | A | 3/1982 | Molari, Jr. |
| 4,895,286 | A | 1/1990 | Derosa |
| 5,359,109 | A | 10/1994 | Ritscher et al. |
| 6,511,753 | B1 | 1/2003 | Teranishi et al. |
| 7,351,477 | B2 | 4/2008 | Yamaya et al. |
| 7,785,715 | B2 | 8/2010 | Tsumura et al. |
| 2002/0015800 | A1 | 2/2002 | Miyamoto et al. |
| 2002/0064663 | A1 | 5/2002 | Murphy et al. |
| 2004/0076840 | A1 | 4/2004 | Akamatsu et al. |
| 2004/0152825 | A1 | 8/2004 | Yamamoto et al. |
| 2005/0227092 | A1 | 10/2005 | Yamaya et al. |
| 2007/0009657 | A1 | 1/2007 | Zhang et al. |
| 2007/0053062 | A1 | 3/2007 | Sasaki et al. |
| 2007/0141305 | A1 | 6/2007 | Kasai et al. |
| 2008/0064814 | A1 | 3/2008 | Yamamoto et al. |
| 2008/0090004 | A1 | 4/2008 | Zhang et al. |

(Continued)

FOREIGN PATENT DOCUMENTS

CN 103443223 A 12/2013
EP 0565743 A1 10/1993

(Continued)

OTHER PUBLICATIONS

Park et al., "Long Perfluoroalkyl Chains are not Required for Dynamically Oleophobic Surfaces," Green Chemistry, vol. 15, 2013, pp. 100-104.
Urata et al., "How to Reduce Resistance to Movement of Alkane Liquid Drops Across Tilted Surfaces Without Relying on Surface Roughening and Perfluorination," Langmuir, vol. 28, Nov. 30, 2012, pp. 17681-17689.
Urata et al., "Smooth, Transparent and Nonperfluorinated Surfaces Exhibiting Unusual Contact Angle Behavior Toward Organic Liquids," RSC Advances, vol. 2, 2012, pp. 9805-9808.

(Continued)

Primary Examiner — Kelechi C Egwim
(74) Attorney, Agent, or Firm — Birch, Stewart, Kolasch & Birch, LLP

(57) ABSTRACT

The object of the present invention is to provide a water/oil-repellent coating composition for forming a film capable of attaining both water/oil repellency and abrasion resistance. The water/oil-repellent coating composition comprises: an organosilicon compound (A) and a metal compound (B), wherein at least one first hydrocarbon chain-containing group and at least one hydrolyzable group are bonded to a silicon atom in the organosilicon compound (A), where in at least one hydrolyzable group is bonded to a metal atom in the metal compound (B), wherein a second hydrocarbon chain-containing group having a length shorter than the length of the first hydrocarbon chain-containing group may be bonded to the metal atom in the metal compound (B), and wherein a molar ratio of the metal compound B) to the organosilicon compound (A) as metal compound (B)/organosilicon compound (A) is not less than 18 and not more than 48.

6 Claims, No Drawings

(56) References Cited

U.S. PATENT DOCUMENTS

| | | |
|---|---|---|
| 2011/0117344 A1 | 5/2011 | Chen et al. |
| 2011/0165808 A1 | 7/2011 | Zimmermann et al. |
| 2013/0340992 A1 | 12/2013 | Akinaga et al. |
| 2015/0021643 A1 | 1/2015 | Kurino et al. |
| 2015/0118502 A1 | 4/2015 | Mitsuhashi et al. |
| 2016/0032146 A1 | 2/2016 | Hozumi et al. |
| 2017/0015842 A1 | 1/2017 | Hozumi et al. |

FOREIGN PATENT DOCUMENTS

| | | | | |
|---|---|---|---|---|
| JP | 5-148451 A | 6/1993 | | |
| JP | 6-32991 A | 2/1994 | | |
| JP | 7-48560 A | 2/1995 | | |
| JP | 7-161453 A | 6/1995 | | |
| JP | 7-179480 A | 7/1995 | | |
| JP | 9-157636 A | 6/1997 | | |
| JP | 9-309889 A | 12/1997 | | |
| JP | 10-326559 A | 12/1998 | | |
| JP | 11-92714 A | 4/1999 | | |
| JP | 11-218926 A | 8/1999 | | |
| JP | 2000-17229 A | 1/2000 | | |
| JP | 2000-80354 A | 3/2000 | | |
| JP | 2000-182513 A | 6/2000 | | |
| JP | 2000-195415 A | 7/2000 | | |
| JP | 2002-256258 A | 9/2002 | | |
| JP | 2004-122106 A | 4/2004 | | |
| JP | 2005-120236 A | 5/2005 | | |
| JP | 2008-96516 A | 4/2008 | | |
| JP | 2008-137858 A | 6/2008 | | |
| JP | 2009-521551 A | 6/2009 | | |
| JP | 2013-213181 A | 7/2010 | | |
| JP | 2010-222703 A | 10/2010 | | |
| JP | 2010-248468 A | 11/2010 | | |
| JP | 2011-111509 A | 6/2011 | | |
| JP | 2011-174001 A | 9/2011 | | |
| JP | 2012-17394 A | 1/2012 | | |
| JP | 2012-46765 A | 3/2012 | | |
| JP | 2012-214588 A | 11/2012 | | |
| JP | 2013-155375 A | 8/2013 | | |
| JP | 2013-173939 A | 9/2013 | | |
| JP | 2013-222836 A | 10/2013 | | |
| JP | 2013213181 A | * | 10/2013 | |
| JP | 2013-249389 A | 12/2013 | | |
| JP | 2014-15609 A | 1/2014 | | |
| JP | 2014-37548 A | 2/2014 | | |
| JP | 5472543 B2 | 4/2014 | | |
| JP | 2014-76924 A | 5/2014 | | |
| JP | 2014-185334 A | 10/2014 | | |
| KR | 10-2006-0045524 A | 5/2006 | | |
| TW | 201414769 A | 4/2014 | | |
| WO | WO 2010/074264 A1 | 7/2010 | | |
| WO | WO-2010074264 A1 | * | 7/2010 | ............. C08L 83/04 |
| WO | WO 2012/137976 A1 | 10/2012 | | |

OTHER PUBLICATIONS

Urata et al., "Unusual Dynamic Dewetting Behavior of Smooth Perfluorinated Hybrid Films: Potential Advantages over Conventional Textured and Liquid-Infused Perfluorinated Surfaces," Langmuir, vol. 29, Sep. 11, 2013, pp. 12472-12482.

Urata et al., "Why Can Organic Liquids Move Easily on Smooth Alkyl-Terminated Surfaces?" Langmuir, vol. 30, Mar. 24, 2014, pp. 4049-4055.

U.S. Appl. No. 15/522,626, filed Apr. 27, 2017.

Aist, "Transparent Coating Film Excellent in Oil Repellency," URL: http://www.aist.go.jp/aist_j/press_release/pr2012/pr20120313/pr20120313.html, Mar. 13, 2012, 5 pages, with partial English translation.

Gao et al., "Contact Angle Hysteresis Explained," Langmuir, vol. 22, No. 14, 2006 (published online Jun. 3, 2006), pp. 6234-6237.

* cited by examiner

WATER/OIL-REPELLENT COATING COMPOSITION

TECHNICAL FIELD

The present invention relates to a water/oil-repellent coating composition for forming a film capable of imparting water/oil repellency to various kinds of substrates.

BACKGROUND ART

In various kinds of display devices, optical elements, semiconductor elements, building materials, automobile components, nanoimprint techniques and solar cell members, deposition of liquid droplets on a surface of a substrate may cause a problem of contamination and corrosion of the substrate, or further the deterioration in the performance due to the contamination and corrosion. Therefore, in these fields, the substrate surface is required to have good water/oil repellency. Particularly, it is required not only the prevention of deposition of liquid droplets on the substrate surface, but also the ease of removing deposited liquid droplets.

Patent Document 1 suggests a solution containing organosilane and a metal alkoxide, and further containing an organic solvent, water and a catalyst.

PRIOR ART DOCUMENTS

Patent Documents

Patent Document 1: JP 2013-213181 A

SUMMARY OF THE INVENTION

Problems to Be Solved By the Invention

The present inventors found that an organic-inorganic transparent hybrid film obtained from the solution described in Cited Document 1 above may have insufficient hardness. When the hardness of a film is insufficient, the film is apt to be broken by friction and liquid droplets may become easily deposited or hardly removed, which results in the problem of contamination and corrosion of a substrate, or further deterioration in the performance. The object of the present invention is to provide a water/oil-repellent coating composition for forming a film capable of attaining both water/oil repellency and abrasion resistance.

Solutions to the Problems

The present inventors extensively studied in view of the situations described above, and resultantly found that when an organosilicon compound in which a hydrocarbon chain-containing group and a hydrolyzable group are bonded to a silicon atom and a metal compound in which a hydrolyzable group is bonded to a metal atom are used while the ratio of these compounds is adjusted within a specific range, a water/oil-repellent coating composition capable of providing a coating film having both water/oil repellency and abrasion resistance is obtained, thereby leading to the completion of the present invention.

The water/oil-repellent coating composition of the present invention comprises an organosilicon compound (A) and a metal compound (B), wherein at least one first hydrocarbon chain-containing group and at least one hydrolyzable group are bonded to a silicon atom in the organosilicon compound (A), wherein at least one hydrolyzable group is bonded to a metal atom in the metal compound (B), wherein a second hydrocarbon chain-containing group having a length shorter than the length of the first hydrocarbon chain-containing group may be bonded to the metal atom in the metal compound B), and wherein a molar ratio of the metal compound (B) to the organosilicon compound (A) as metal compound (B)/organosilicon compound A) is not less than 18 and not more than 48.

The water/oil-repellent coating composition has preferably the molar ratio of the metal compound (B) to the organosilicon compound (A) as metal compound (B)/organosilicon compound (A) is not less than 18 and not more than 36.

The water/oil-repellent coating composition preferably further comprises a solvent (C). The solvent (C) preferably includes an alcohol-based solvent.

The organosilicon compound (A) is preferably represented by formula (I) below:

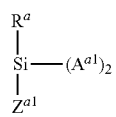

wherein $R^a$ represents the first hydrocarbon group, each of $A^{a1}$ independently represents a hydrolyzable group, $Z^{a1}$ represents the first hydrocarbon chain-containing group, the second hydrocarbon chain-containing group having a length shorter than a length of the first hydrocarbon chain-containing group, or a hydrolyzable group, $R^a$ and $Z^{a1}$ may be the same or different when $Z^{a1}$ is the first hydrocarbon chain-containing group, $Z^{a1}$ and $A^{a1}$ may be the same or different when $Z^{a1}$ is the hydrolyzable group, and $R^a$ and $Z^{a1}$ may be the same or different when the water/oil-repellent coating composition comprises a plural number of formulae (I).

The metal compound (B) is preferably represented by formula (II) below:

$$M(R^{b1})(A^{b1})$$ (II)

wherein $R^{b1}$ represents the second hydrocarbon group or the hydrolyzable group, each of $A^{b1}$ independently represents a hydrolyzable group, M represents Al, Fe, In, Ge, Hf, Si, Ti, Sn, Zr or Ta, and m represents an integer of 1 to 4 according to a kind of metal atom.

In the formula (II), $R^{b1}$ and $A^{b1}$ preferably represent the same group and M preferably represents Si in the formula (II).

Effects of the Invention

A water/oil-repellent coating composition of the present invention comprises an organosilicon compound in which a hydrocarbon chain-containing group and a hydrolyzable group are bonded to a silicon atom and a metal compound in which a hydrolyzable group is bonded to a metal atom, and the molar ratio of these compounds is adjusted within a specific range, and therefore both of the water/oil repellency and abrasion resistance can be attained.

Mode for Carrying Out the Invention

A water/oil-repellent coating composition of the present invention comprises an organosilicon compound (A) and a metal compound (B), wherein at least one first hydrocarbon chain-containing group and at least one hydrolyzable group are bonded to a silicon atom in the organosilicon compound (A), wherein at least one hydrolyzable group is bonded to a metal atom in the metal compound (B), and wherein a second hydrocarbon chain-containing group having a hydrocarbon chain moiety with a carbon number smaller than that of the first hydrocarbon chain-containing group may be bonded to the metal atom. The hydrolyzable group bonded to the silicon atom or metal atom in the water/oil-repellent coating composition is subjected to hydrolysis and polycondensation to form a coating film where the first hydrocarbon chain-containing group is bonded to a part of silicon atoms forming the coating film. The first hydrocarbon chain-containing group imparts a water/oil repellency function to the coating film, and an element (e.g. the above-mentioned metal atom), to which the first hydrocarbon chain-containing group is not bonded, functions substantially as a spacer in the coating film. In the water/oil-repellent coating composition of the present invention, the molar ratio of the organosilicon compound (A) and the metal compound (B) is adjusted within a specific range, and thereby the first hydrocarbon chain-containing group and the spacer exist at a specific ratio in the resulting coating film. Thus, a coating film can be provided having an improved water/oil repellency function and excellent abrasion resistance.

In the organosilicon compound (A), the first hydrocarbon chain-containing group bonded to the center silicon atom is a monovalent group containing a hydrocarbon chain, and the hydrocarbon chain imparts water/oil repellency to the interface as surface of the resulting coating film. Particularly, a friction coefficient between a liquid droplet, as water droplet, oil droplet or the like, and the coating film decreases, and thus the liquid droplet moves more easily.

The first hydrocarbon chain-containing group is composed only of a hydrocarbon group (hydrocarbon chain), and a part of methylene groups (—$CH_2$—) of the hydrocarbon chain may be replaced by oxygen atoms as necessary. Even the group in which a part of itself is replaced by oxygen atoms as described above is classified as a hydrocarbon chain-containing group because a hydrocarbon chain exists in the remaining part. Methylene groups (—$CH_2$—) adjacent to Si atoms are not replaced by oxygen atoms, and two continuous methylene groups (—$CH_2$—) are not simultaneously replaced by oxygen atoms. Hereinafter, the first hydrocarbon chain-containing group is described and an oxygen-unsubstituted hydrocarbon chain-containing group (i.e., monovalent hydrocarbon group) is taken as an example unless otherwise specified, and a part of the methylene groups (—$CH_2$—) can be replaced by oxygen atoms in the following.

The first hydrocarbon chain-containing group has a carbon number of preferably not less than 6 and not more than 20, more preferably not less than 7 and not more than 17, further preferably not less than 8 and not more than 15 in the case where the first hydrocarbon chain-containing group is a hydrocarbon group.

The first hydrocarbon chain-containing group may be a branched chain or a linear chain in the case of a hydrocarbon group. The first hydrocarbon chain-containing group is preferably a saturated or unsaturated aliphatic hydrocarbon chain-containing group, more preferably a saturated aliphatic hydrocarbon chain-containing group in the case of a hydrocarbon group.

The saturated aliphatic hydrocarbon chain-containing group is more preferably a saturated aliphatic hydrocarbon group. Examples of the saturated aliphatic hydrocarbon group include hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group and icosyl group in the case of a hydrocarbon group.

When a part of methylene groups (—$CH_2$—) of the hydrocarbon group are replaced by oxygen atoms, the hydrocarbon group is preferably a saturated aliphatic hydrocarbon group. Specific examples of the group in which a part of methylene groups (—$CH_2$—) of the hydrocarbon group are replaced by oxygen atoms may include groups having (poly)ethylene glycol units and groups having (poly)propylene glycol units.

In the organosilicon compound (A), the number of first the hydrocarbon chain-containing groups bonded to the center silicon atom is preferably not less than 1 and not more than 2, especially preferably 1.

The hydrolyzable group of the organosilicon compound (A) may be a group that provides a hydroxy group (silanol group) through hydrolysis, and preferred examples thereof may include alkoxy groups with a carbon number of 1 to 4, such as methoxy group, ethoxy group, propoxy group and butoxy group; hydroxy group; acetoxy group; chlorine atom; and isocyanate group. In particular, alkoxy groups with a carbon number of 1 to 4 are preferable, and alkoxy groups with a carbon number of 1 or 2 are more preferable.

In the organosilicon compound (A), the number of hydrolyzable groups bonded to the center silicon atom is normally not less than 1, preferably not less than 2, and is normally preferably not more than 3.

In addition to the first hydrocarbon chain-containing group and hydrolyzable group, the second hydrocarbon chain-containing group that comprises a hydrocarbon chain moiety with a carbon number smaller than that of the first hydrocarbon group-containing group may be bonded to the silicon atom of the organosilicon compound (A).

The second hydrocarbon chain-containing group should have a length shorter than that of the first hydrocarbon chain-containing group. The length of each of the first and second hydrocarbon chain-containing groups can be evaluated as a length (longest chain length) of the longest linear chain (hereinafter, also referred to as a "main chain") including elements that is bonded to metal atoms such as Si atoms in the hydrocarbon chain-containing group. For ensuring that the second hydrocarbon chain-containing group has a main chain shorter than that of the first hydrocarbon chain-containing group, for example, the carbon number of the hydrocarbon chain moiety in the second hydrocarbon chain-containing group is preferably smaller than the carbon number of the first hydrocarbon chain moiety. Normally, the second hydrocarbon chain-containing group is composed only of a hydrocarbon group (hydrocarbon chain) as in the case of the first hydrocarbon chain-containing group, and may be a group in which a part of methylene groups (—$CH_2$—) are replaced by oxygen atoms. Methylene groups (—$CH_2$—) adjacent to Si atoms are not replaced by oxygen atoms, and two continuous methylene groups (—$CH_2$—) are not simultaneously replaced by oxygen atoms.

The carbon number of the hydrocarbon chain moiety means the number of carbon atoms that form the hydrocarbon group (hydrocarbon chain) in the case of an oxygen-unsubstituted hydrocarbon chain-containing group, while the carbon number of the hydrocarbon chain moiety means the number of carbon atoms which number is counted with the assumption that the oxygen atoms are considered as methylene groups (—$CH_2$—) in the case of an oxygen-substituted hydrocarbon chain-containing group.

Hereinafter, the second hydrocarbon chain-containing group is described while an oxygen-unsubstituted hydrocarbon chain-containing group (i.e., monovalent hydrocarbon group) is taken as an example unless otherwise specified, and a part of the methylene groups (—$CH_2$—) can be replaced by oxygen atoms in the following.

The second hydrocarbon chain-containing group has a carbon number of preferably not less than 1 and not more than 5, more preferably not less than 1 and not more than 3 in the case where the second hydrocarbon chain-containing group is a hydrocarbon group. The second hydrocarbon chain-containing group may be a branched chain or a linear chain in the case of a hydrocarbon group.

The second hydrocarbon chain-containing group is preferably a saturated or unsaturated aliphatic hydrocarbon chain-containing group, more preferably a saturated aliphatic hydrocarbon chain-containing group in the case of a hydrocarbon group. The saturated aliphatic hydrocarbon chain-containing group is more preferably a saturated aliphatic hydrocarbon group in the case of a hydrocarbon group. Examples of the saturated aliphatic hydrocarbon group include methyl group, ethyl group, propyl group, butyl group and pentyl group.

When a part of methylene groups (—$CH_2$—) of the hydrocarbon group are replaced by oxygen atoms, the hydrocarbon group is preferably a saturated aliphatic hydrocarbon group, and specific examples of the group in which a part of methylene groups (—$CH_2$—) of the hydrocarbon group are replaced by oxygen atoms may include groups having (poly)ethylene glycol units.

In the organosilicon compound (A), the number of the second hydrocarbon chain-containing groups bonded to the center silicon atom is preferably not more than 2, more preferably not more than 1, especially preferably 0.

Specifically, the organosilicon compound (A) is preferably a compound represented by the following formula (I).

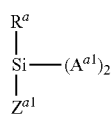

(I)

wherein $R^a$ represents the first hydrocarbon chain-containing group, each of $A^{a1}$ independently represents a hydrolyzable group, $Z^{a1}$ represents the first hydrocarbon chain-containing group, the second hydrocarbon chain-containing group or the hydrolyzable group, $R^a$ and $Z^{a1}$ may be the same or different when $Z^{a1}$ is the first hydrocarbon chain-containing group, $Z^{a1}$ and $A^{a1}$ may be the same or different when $Z^{a1}$ is a hydrolyzable group, and $R^a$ and $Z^{a1}$ may be the same or different when the transparent film comprises a plural number of formulae (I).

In the formula (I), the first hydrocarbon chain-containing group represented by $R^a$ or $Z^{a1}$, the second hydrocarbon chain-containing group represented by $Z^{a1}$, and the hydrolyzable group represented by $A^{a1}$ or $Z^{a1}$ can be appropriately selected from the groups described above as the first hydrocarbon chain-containing group, the second hydrocarbon chain-containing group and the hydrolyzable group, respectively.

In the formula (I), $Z^{a1}$ is preferably the second hydrocarbon chain-containing group or the hydrolyzable group, more preferably the hydrolyzable group.

Preferable examples of the organosilicon compound (A) may include compounds having one first hydrocarbon chain-containing group and three hydrolyzable groups; and compounds having one first hydrocarbon chain-containing group, one second hydrocarbon chain-containing group and two hydrolyzable groups.

In the compound having one first hydrocarbon chain-containing group and three hydrolyzable groups, the three hydrolyzable group s are bonded to the silicon atom. Examples of the group in which three hydrolyzable groups are bonded to a silicon atom include trialkoxysilyl groups such as trimethoxysilyl group, triethoxysilyl group, tripropoxysilyl group and tributoxysilyl group; trihydroxysilyl group; triacetoxysilyl group; trichlorosilyl group; and triisocyanatesilyl group, and examples of the compound having one first hydrocarbon chain-containing group and three hydrolyzable groups include compounds in which one first hydrocarbon chain-containing group selected from the groups described above is bonded to the silicon atom of the above-mentioned group in which three hydrolyzable groups are bonded to a silicon atom.

In the compound having one first hydrocarbon chain-containing group, one second hydrocarbon chain-containing group and two hydrolyzable groups, one second hydrocarbon chain-containing group and two hydrolyzable groups are bonded to a silicon atom. Examples of the group in which one second hydrocarbon chain-containing group and two hydrolyzable groups are bonded to a silicon atom include alkyldialkoxysilyl groups such as methyldimethoxysilyl group, ethyldimethoxysilyl group, methyldiethoxysilyl group, ethyldiethoxysilyl group and methyldipropoxysilyl group, and examples of the compound having one first hydrocarbon chain-containing group, one second hydrocarbon chain-containing group and two hydrolyzable groups include compounds in which one first hydrocarbon chain-containing group selected from the groups described above is bonded to the silicon atom of the above-mentioned group.

Specific examples of the compound having one first hydrocarbon chain-containing group and three hydrolyzable groups include alkyltrialkoxysilanes having an alkyl group with a carbon number of 6 to 20 such as alkyltrimethoxysilanes having an alkyl group with a carbon number of 6 to 20, and alkyltriethoxysilanes having an alkyl group with a carbon number of 6 to 20; alkyltrihydroxysilanes having an alkyl group with a carbon number of 6 to 20; alkyltriacetoxysilanes having an alkyl group with a carbon number of 6 to 20; alkyltrichlorosilanes having an alkyl group with a carbon number of 6 to 20; and alkyltriisocyanatesilanes having an alkyl group with a carbon number of 6 to 20.

Specific examples of the compound having one first hydrocarbon chain-containing group, one second hydrocarbon chain-containing group and two hydrolyzable groups include alkylmethyldialkoxysilanes such as alkylmethyldimethoxysilanes having an alkyl group with a carbon number of 6 to 20, and alkylmethyldiethoxysilanes having an alkyl group with a carbon number of 6 to 20; alkylmethyldihydroxysilanes having an alkyl group with a carbon number of 6 to 20; alkylmethyldiacetoxysilanes having an alkyl group with a carbon number of 6 to 20, alkylmethyldichlorosilanes having an alkyl group with a carbon number of 6 to 20; and alkylmethyldiisocyanatesilanes having an alkyl group with a carbon number of 6 to 20.

In particular, compounds having one first hydrocarbon chain-containing group and three hydrolyzable groups are preferable, and alkyltrialkoxysilanes are more preferable.

The metal compound (B) contained in the water/oil-repellent coating composition together with the organosilicon compound (A) is a metal compound in which at least one hydrolyzable group is bonded to the center metal atom. The second hydrocarbon chain-containing group may be bonded to the metal atom. The length of the longest chain in the second hydrocarbon chain-containing group is shorter than the length of the longest chain in the first hydrocarbon chain-containing group bonded to the center silicon atom of the organosilicon compound (A), and the length of the longest chain in the metal compound (B) is shorter than the length of the longest chain in the organosilicon compound. Accordingly, a structure derived from the metal compound (B) is not bulky than a structure derived from the organosilicon compound (A). Thus a part having a spacer function can be formed in the resulting coating film due to the metal compound B) contained in the water/oil-repellent coating composition.

The center metal atom in the metal compound (B) may be a metal atom that is capable of forming a metal alkoxide with a bond to an alkoxy group, and the metals here include semimetals such as Si and Ge. Specific examples of the center metal atom in the metal compound (B) include trivalent metals such as Al, Fe and In; tetravalent metals such as Ge, Hf, Si, Ti, Sn and Zr; and pentavalent metals such as Ta. The center metal atom is preferably a trivalent metal such as Al; a tetravalent metal such as Si, Ti, Zr or Sn; more preferably Al, Si, Ti or Zr; further preferably Si.

The hydrolyzable group in the metal compound (B) may be a group similar to the hydrolyzable group in the organosilicon compound (A), and is preferably an alkoxy group with a carbon number of 1 to 4, more preferably an alkoxy group with a carbon number of 1 or 2. The hydrolyzable groups in the organosilicon compound (A) and the metal compound (B) may be the same or different. Each of the hydrolyzable groups in the organosilicon compound (A) and the metal compound (B) is preferably an alkoxy group with a carbon number of 1 to 4.

In the metal compound (B), the number of hydrolyzable groups is preferably not less than 1, more preferably not less than 2, further preferably not less than 3, and is preferably not more than 4.

The second hydrocarbon chain-containing group in the metal compound (B) can be appropriately selected from the groups described above, and the number is preferably not more than 1, especially preferably 0.

Specifically, the metal compound (B) is preferably a compound represented by the following formula (II).

wherein $R^{b1}$ represents the second hydrocarbon group or the hydrolyzable group, $A^{b1}$ represents a hydrolyzable group, M represents Al, Fe, In, Ge, Hf, Si, Ti, Sn, Zr or Ta, and m represents an integer of 1 to 4 according to a kind of metal atom.

In the formula (II), the second hydrocarbon chain-containing group represented by $R^{b1}$, and the hydrolyzable group represented by $R^{b1}$ or $A^{b1}$ can be appropriately selected from the groups described above as the second hydrocarbon chain-containing group and the hydrolyzable group.

In the formula (II), $R^{b1}$ is preferably a hydrolyzable group. When $R^{b1}$ is a hydrolyzable group, $R^{b1}$ and $A^{b1}$ may be the same or different, and is preferably the same. Further, the hydrolyzable groups in the organosilicon compound (A) and the metal compound (B) may be the same or different.

In the formula (II), M is preferably Al, Si, Ti, Zr or Sn, more preferably Al, Si, Ti or Zr, further preferably Si. The alkoxide of such a metal atom is easily liquefied, so that the uniformity of the distribution of the following structure (b) capable of functioning as a spacer in the coating film is easily improved.

In the formula (II), m represents 2 when M is a trivalent metal such as Al, Fe or In, m represents 3 when M is a tetravalent metal such as Ge, Hf, Si, Ti, Sn or Zr, and m represents 4 when M is a pentavalent metal such as Ta.

Preferable examples of the metal compound (B) may include compounds having only the hydrolyzable group; and compounds having one second hydrocarbon chain-containing group and two hydrolyzable groups.

Examples of the compound having only the hydrolyzable group include tetraalkoxysilanes such as tetramethoxysilane, tetraethoxysilane, tetrapropoxysilane and tetrabutoxysilane; trialkoxyaluminums such as triethoxyaluminum, tripropoxyaluminum and tributoxyaluminum; trialkoxyirons such as triethoxyiron; trialkoxyindiums such as trimethoxyindium, triethoxyindium, tripropoxyindium and tributoxyindium; tetraalkoxygermaniums such as tetramethoxygermanium, tetraethoxygermanium, tetrapropoxygermanium and tetrabutoxygermanium; tetraalkoxyhafniums such as tetramethoxyhafnium, tetraethoxyhafnium, tetrapropoxyhafnium and tetrabutoxyhafnium; tetraalkoxytitaniums such as tetramethoxytitanium, tetraethoxytitanium, tetrapropoxytitanium and tetrabutoxytitanium; tetraalkoxytins such as tetramethoxytin, tetraethoxytin, tetrapropoxytin and tetrabutoxytin; tetraalkoxyzirconiums such as tetramethoxyzirconium, tetraethoxyzirconium, tetrapropoxyzirconium and tetrabutoxyzirconium; and pentaalkoxytantalums such as pentamethoxytantalum, pentaethoxytantalum, pentapropoxytantalum and pentabutoxytantalum.

Examples of the compound having the second hydrocarbon chain-containing group and the hydrolyzable group include alkyltrialkoxysilanes such as methyltrimethoxysilane, ethyltrimethoxysilane, methyltriethoxysilane, ethyltriethoxysilane and methyltripropoxysilane; and alkenyltrialkoxysilanes such as vinyltrimethoxysilane and vinyltriethoxysilane.

The water/oil-repellent coating composition of the present invention contains the organosilicon compound (A) and the metal compound (B) at a specific ratio, and thus a coating film can be provided which exhibits an improved water/oil repellency function, and excellent hardness. Specifically, in the water/oil-repellent coating composition of the present invention, the molar ratio of the metal compound (B) to the organosilicon compound (A) as metal compound (B)/organosilicon compound (A) is not less than 18 and not more than 48, and is preferably not more than 44, more preferably not more than 40, further preferably not more than 36.

The water/oil-repellent coating composition of the present invention may further contain a solvent (C) in addition to the organ osilicon compound (A) and the metal compound (B). Examples of the solvent (C) include an alcohol-based solvent, an ether-based solvent, a ketone-based solvent, an ester-based solvent and an amide-based solvent. These solvents may be used singly, or used in combination of two or more thereof.

Examples of the alcohol-based solvent include methanol, ethanol, propanol, butanol, ethylene glycol, propylene glycol and diethylene glycol, examples of the ether-based solvent include dimethoxy ethane, tetrahydrofuran and dioxane, examples of the ketone-based solvent include acetone and methyl ethyl ketone, examples of the ester-based solvent include ethyl acetate and butyl acetate, and examples of the amide-based solvent include dimethylformamide.

In particular, alcohol-based solvents and ether-based solvents are preferable, and alcohol-based solvents are more preferable.

The amount of the solvent (C) is preferably not more than 120 parts by mass, more preferably not more than 80 parts by mass, further preferably not more than 60 parts by mass, especially preferably not more than 40 parts by mass, and preferably not less than 3 parts by mass, more preferably not less than 5 parts by mass, further preferably not less than 10 parts by mass, especially preferably not less than 20 parts by mass based on 1 part by mass of the total of the organosilicon compound (A) and the metal compound (B).

Further, in the water/oil-repellent coating composition of the present invention, a catalyst may coexist as necessary. The catalyst can be arbitrarily selected from acidic compounds such as hydrochloric acid; basic compounds; organometallic compounds and the like, which are generally used in a sol-gel method. Examples of the catalyst include acid compounds; basic compounds; and organometallic compounds. Examples of the acidic compound include inorganic acids such as hydrochloric acid and nitric acid; and organic acids such as acetic acid. Examples of the basic compound include ammonia and amine. The organometallic compound include an organometallic compound having as a center metal a metal element such as Al, Fe, Zn, Sn or Zr, and examples thereof include organoaluminum compounds such as aluminum-acetylacetone complexes and aluminum-ethyl acetoacetate complexes; organoiron compounds such as iron octylate; organozinc compounds such as zinc acetylacetonate monohydrate, zinc naphthenate and zinc octylate; and organotin compounds such as dibutyl tin diacetate complexes.

In particular, the catalyst is preferably an organometallic compound, more preferably an organoaluminum compound, especially preferably an organoaluminum ethyl acetoacetate compound.

The amount of the catalyst is preferably not less than 0.0001 parts by mass, more preferably not less than 0.1 parts by mass, further preferably not less than 0.5 parts by mass, especially preferably not less than 1 part by mass, and preferably not more than 20 parts by mass, more preferably not more than 10 parts by mass, further preferably not more than 5 parts by mass based on 100 parts by mass of the total of the organosilicon compound (a) and the metal compound (b).

When the catalyst is an acidic compound (especially preferably hydrochloric acid), the amount of the acidic compound is preferably not less than 0.0001 parts by mass, more preferably not less than 0.0005 parts by mass, further preferably not less than 0.001 parts by mass, and preferably not more than 1 part by mass, more preferably not more than 0.5 parts by mass, further preferably not more than 0.3 parts by mass based on 100 parts by mass of the total of the organosilicon compound (A) and the metal compound (B).

Further, at the contact of the organosilicon compound (A) and the metal compound (B) to a substrate, various kinds of additives such as an antioxidant, a rust inhibitor, an ultraviolet absorber, a light stabilizer, an antifungal agent, an antibacterial agent, an organism deposition preventing agent, a deodorizer, a pigment, a flame retardant and an antistatic agent may coexist.

Examples of the antioxidant include phenol-based antioxidants, sulfur-based antioxidants, phosphorus-based antioxidants and hindered amine-based antioxidants.

Examples of the phenol-based antioxidant include n-octadecyl-3-(4-hydroxy-3,5-di-t-butylphenyl)propionate, 2,6-di-t-butyl-4-methylphenol, 2,2-thio-diethylene-bis-[3-(3,5-di-t-butyl-4-hydroxyphenyl)propionate], tri-ethyleneglycol-bis-[3-(3-t-butyl-5-methyl-4-hydroxyphenyl)propionate], 3,9-bis[2-{3-(3-t-butyl-4-hydroxy-5-methylphenyl)propionyloxy}-1,1-dimethylethyl]-2,4,8,10-tetraoxaspiro[5.5]undecane, tetrakis{3-(3,5-di-t-butyl-4-hydroxyphenyl)-propionic acid}pentaerythrityl esters, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl)benzene, tris(3,5-di-t-butyl-4-hydroxybenzyl)isocyanurate, 1,3,5-tris(4-t-butyl-3-hydroxy-2,6-dimethylbenzyl)-1,3,5-triazine-2,4,6-(1H,3H,5H)-trione, 2,2'-methylenebis(6-t-butyl-4-methylphenol), 4,4'-butylidenebis(6-t-butyl-3-methylphenol) and 4,4'-thiobis(6-t-butyl-3-methylphenol).

Examples of the sulfur-based antioxidant include 3,3'-thiodipropionic acid di-n-dodecyl esters, 3,3'-thiodipropionic acid di-n-tetradecyl esters, 3,3'-thiodipropionic acid di-n-octadecyl esters and tetrakis(3-dodecylthiopropionic acid)pentaerythritol esters.

Examples of the phosphorus-based antioxidant include tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, tetrakis(2,4-di-t-butylphenyl)-4,4'-biphenylene diphosphonite and bis-[2,4-di-t-butyl-(6-methyl)phenyl]ethyl phosphite.

Examples of the hindered amine-based antioxidant include sebacic acid bis(2,2,6,6-tetramethyl-4-piperidyl)esters (melting point: 81 to 86° C.), 2,2,6,6-tetramethyl-4-piperidyl methacrylate (melting point: 58° C.), and poly[{6-(1,1,3,3-tetramethylbutyl)amino-1,3,5-triazine-2,4-diyl}{(2,2,6,6-tetramethyl-4-piperidyl)imino}-1,6-hexamethylene{(2,2,6,6-tetramethyl-4-piperidyl)imino}].

Examples of the rust inhibitor include alkanol amines such as triethanol amine; quaternary ammonium salts; alkanethiols; azoles such as imidazoline, imidazole, alkylimidazoline derivatives, benzimidazole, 2-mercaptobenzimidazole and benzotriazole; sodium metavanadate; bismuth citrate; phenol derivatives; amine compounds such as aliphatic amines including alkylamines and polyalkenylamines, aromatic amines, ethoxylated amines, cyanoalkylamines, cyclohexylamine benzoate, aliphatic diamines such as alkylenediamines, and aromatic diamines; amides of the amine compounds and carboxylic acid; alkyl esters; pyrimidine; naphthenic acid; sulfonic acid composites; nitrous acid salts such as calcium nitrite, sodium nitrite and dicyclohexylamine nitrite; polyol compounds such as polyalcohols and polyphenols; heteropolyacid salts such as sodium molybdate, sodium tungstate, sodium phosphonate, sodium chromate and sodium silicate; gelatin; polymers of carboxylic acid; nitro compounds; formaldehyde; acetylene alcohol; thiol compounds such as aliphatic thiols, aromatic thiols and acetylene thiols; sulfide compounds such as aliphatic sulfide, aromatic sulfide and acetylene sulfide; sulfoxide compounds such as sulfoxide and dibenzylsulfoxide; thio urea; combinations of an amine or quaternary ammonium salt and halogen ions; combinations of an alkylamine and potassium iodide; combinations of tannin and sodium phosphate; combinations of triethanolamine and laurylsarcosine; combinations of triethanolamine, laurylsarcosine and benzotriazole; and combinations of an alkylamine, benzotriazole, sodium nitrite and sodium phosphate.

Examples of the ultraviolet absorber/light stabilizer include for example 2-(5-methyl-2-hydroxyphenyl)benzotriazole, 2-[2-hydroxy-3,5-bis(α,α-dimethylbenzyl)phenyl]-2H-benzotriazole, 2-(3-t-butyl-5-methyl-2-hydroxyphenyl)-5-chlorobenzotriazole, 2-(2'-hydroxy-5'-t-octylphenyl)benzotriazole, condensation products of methyl-3-[3-t-butyl-5-(2H-benzotriazol-2-yl)-4-hydroxyphenyl]propionate-polyethylene glycol (molecular weight: about 300), hydroxyphenyl benzotriazole derivatives, 2-(4,6-diphenyl-1,3,5-triazin-2-yl)-5[(hexyl)oxy]-phenol and 2-ethoxy-2'-ethyl-oxalic acid bisanilide.

Examples of the antifungal agent/antibacterial agent include 2-(4-thiazolyl)benzimidazole, sorbic acid, 1,2-benzisothiazolin-3-one, (2-pyridylthio-1-oxide)sodium, dehydroacetic acid, 2-methyl-5-chloro-4-isothiazolone complexes, 2,4,5,6-tetrachlorophthalonitrile, methyl 2-benzimidazolecarbamate, methyl 1-(butylcarbamoyl)-2-benzimidazolecarbamate, mono- or dibromocyanoacetamides, 1,2-dibromo-2,4-dicyanobutane, 1,1-dibromo-1-nitropropanol and 1,1-dibromo-1-nitro-2-acetoxypropane.

Examples of the organism deposition preventing agent include tetramethylthiuram disulfide, zinc bis(N,N-dimethyldithiocarbamate), 3-(3,4-dichlorophenyl)-1,1-dimethylurea, dichloro-N-((dimethyl amino)sulfonyl)fluoro-N-(P-tryl)methanesulpheneamide, pyridine-tri phenylborane, N,N-dimethyl-N'-phenyl-N'-(fluorodichloromethylthio)sulfamide, cuprous thiocyanate (1), cuprous oxide, tetrabutylthiuram disulfide, 2,4,5,6-tetrachloroisophthalonitrile, zinc ethylenebisdithiocarbamate, 2,3,5,6-tetrachloro-4-(methylsulfonyl)pyridine, N-(2,4,6-trichlorophenyl)maleimide, bis(2-pyridinethiol-1-oxide)zinc salts, bis(2-pyridinethiol-1-oxide) copper salts, 2-methylthio-4-t-butylamino-6-cyclopropylamino-s-triazine, 4,5-dichloro-2-n-octyl-4-isothiazolin-3-one, furanones, alkylpyridine compounds, gramine-based compounds and isotonyl compounds.

Examples of the deodorizer include organic acids such as lactic acid, succinic acid, malic acid, citric acid, maleic acid, malonic acid, ethylenediamine polyacetic acid, alkane-1,2-dicarboxylic acids, alkene-1,2-dicarboxylic acids, cycloalkane-1,2-dicarboxylic acids, cycloalkene-1,2-dicarboxylic acids and naphthalene sulfonic acid; fatty acid metals such as zinc undecylenate, zinc 2-ethyl hexanoate and zinc ricinoleate; metal compounds such as iron oxide, iron sulfate, zinc oxide, zinc sulfate, zinc chloride, silver oxide, copper oxide, metal (iron, copper or the like) chlorophyllin sodium, metal (iron, copper, cobalt or the like) phthalocyanine, metal (iron, copper, cobalt or the like) tetrasulfonic acid phthalocyanine, titanium dioxide and visible light-responsive titanium dioxide nitrogen-doped-type or the like); cyclodextrins such as α-, β- or γ-cyclodextrin, methyl derivatives thereof, hydroxypropyl derivatives, glucosyl derivatives and maltosyl derivatives; and porous materials such as acrylic acid-based polymers including porous methacrylic acid polymers and porous acrylic acid polymers, aromatic-based polymers including porous divinylbenzene polymers, porous styrene-divinylbenzene-vinylpyridine polymers and porous divinylbenzene-vinylpyridine polymers, copolymers thereof, chitin, chitosan, activated carbon, silica gel, activated alumina, zeolite and ceramics.

Examples of the pigment include carbon black, titanium oxide, phthalocyanine-based pigments, quinacridone-based pigments, isoindolinone-based pigments, perylene or perynine-based pigments, quinophthalone-based pigments, diketopyrrolo-pyrrole-based pigments, dioxazine-based pigments, disazo-condensed-based pigments and benzimidazolone-based pigments.

Examples of the flame retardant include decabromobiphenyl, antimony trioxide, phosphorus-based flame retardants and aluminum hydroxide.

Examples of the antistatic agent include cationic surfactants of quaternary ammonium salt type; amphoteric surfactants of betaine type; anionic surfactants of alkyl phosphate type; cationic surfactants such as primary amine salts, secondary amine salts, tertiary amine salts, quaternary amine salts and pyridine derivatives; anionic surfactants such as sulfated oil, soap, sulfated ester oil, sulfated amide oil, sulfated ester salts of olefins, fatty alcohol sulfuric acid ester salts, alkylsulfuric acid ester salts, fatty acid ethyl sulfonic acid salts, alkylnaphthalene sulfonic acid salts, alkylbenzene sulfonic acid salts, succinic acid ester sulfonic acid salts and phosphoric acid ester salts; nonionic surfactants such as partial fatty acid esters of polyhydric alcohols, ethylene oxide adducts of fatty alcohols, ethylene oxide adducts of fatty acids, ethylene oxide adducts of fatty amino or fatty acid amides, ethylene oxide adducts of alkylphenols, ethylene oxide adducts of partial fatty acid esters of polyhydric alcohols and polyethylene glycol; and amphoteric surfactants such as carboxylic acid derivatives and imidazoline derivatives.

As additives, a lubricant, a filler, a plasticizer, a nucleating agent, an antiblocking agent, a foaming agent, an emulsifier, a brightening agent, a binder and the like may further coexist.

When these additives are contained, the content of the additives is normally 0.1 to 70% by mass, preferably 0.1 to 50% by mass, more preferably 0.5 to 30% by mass, further preferably 2 to 15% by mass in the coating composition containing the organosilicon compound (A) and the metal compound (B).

The content of the total of the organosilicon compound (A) and the metal compound (B) (the total of the organosilicon compound A), the metal compound (B) and the solvent (C) when the solvent (C) is contained) is normally not less than 60% by mass, preferably not less than 75% by mass, more preferably not less than 85% by mass, further preferably not less than 95% by mass in the water/oil-repellent coating composition.

Further, the water/oil-repellent coating composition of the present invention includes the organosilicon compound (A) in which one first hydrocarbon chain-containing group with a carbon number of not less than 7 and not more than 9 (especially 8) and three hydrolyzable groups are bonded to a silicon atom, and the metal compound (B) in which four hydrolyzable groups are bonded to a metal atom (especially a silicon atom), and the weight ratio of the metal compound (B) to the organosilicon compound (A) as metal compound (B)/organosilicon compound (A) is especially preferably not less than 18 and not more than 36. When the structure and molar ratio of the organosilicon compound (A) to the metal compound (B) are adjusted as described above, the resulting coating film attains both hardness and water/oil repellency to a higher degree.

By contacting the water/oil-repellent coating composition of the present invention to a substrate, the hydrolyzable groups of the organosilicon compound (A) and the metal compound (B) are subjected to hydrolysis and polycondensation to form a water/oil-repellent coating film on the surface of the substrate.

The method for contacting the water/oil-repellent coating composition to a substrate is preferably a method in which a surface of the substrate is coated with the water/oil-repellent coating composition for example. Examples of the coating method include a spin coating method, a dip coating method, a spray coating method, a roll coating method, a bar coating method and a die coating method, and a spin coating method or spray coating method is preferable.

The water/oil-repellent coating composition and the substrate are preferably left standing in air while being in contact with each other, and moisture in the air is whereby captured to accelerate hydrolysis and polycondensation of the hydrolyzable group. The resulting coating film may be further dried. The heating/drying temperature is normally 40 to 250° C., preferably 60 to 200° C., further preferably 60 to 150° C.

The resulting water/oil-repellent coating film comprises a network-like backbone in which silicon atoms and the metal atoms (preferably only silicon atoms) are bonded via oxygen atoms. The water/oil-repellent coating film comprises a structure in which the first hydrocarbon chain-containing group is bonded to a part of silicon atoms originating from the organosilicon compound (A) and forming the backbone.

The structure in which the first hydrocarbon chain-containing group is bonded to a silicon atom is preferably a structure (a) represented by the following formula (1).

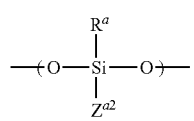

(1)

wherein $R^a$ represents the first hydrocarbon chain-containing group, $Z^{a2}$ represents the first hydrocarbon chain-containing group, the second hydrocarbon chain-containing group or —O— group, $R^a$ and $Z^{a2}$ may be the same or different when $Z^{a2}$ is the first hydrocarbon chain-containing group, and $R^a$ and $Z^{a2}$ may be the same or different when the transparent film comprises a plural number of formulae (1).

In the formula (1), the first hydrocarbon chain-containing group represented by $R^a$ or $Z^{a2}$, and the second hydrocarbon chain-containing group represented by $Z^{a2}$ can be appropriately selected from the groups described above.

In particular, $Z^{a2}$ is preferably a second hydrocarbon chain-containing group or —O— group, and especially preferably —O— group.

Preferable examples of the structure (a) may include structures represented by the following formulae (1-1) to (1-32) for example.

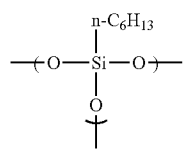

(1-1)

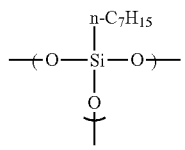

(1-2)

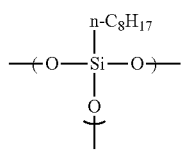

(1-3)

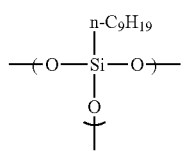

(1-4)

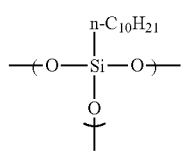

(1-5)

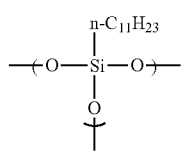

(1-6)

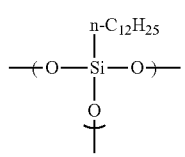

(1-7)

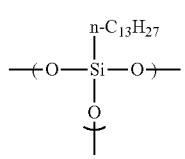

(1-8)

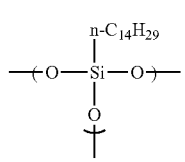

(1-9)

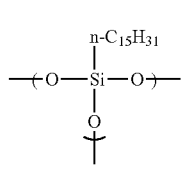

(1-10)

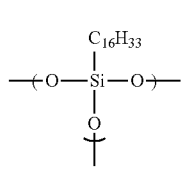

(1-11)

-continued
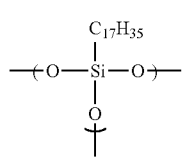 (1-12)
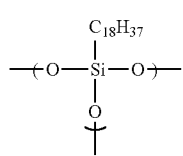 (1-13)
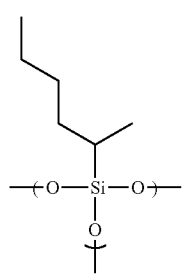 (1-14)
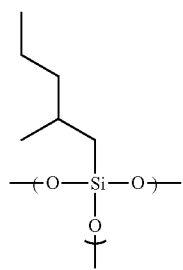 (1-15)
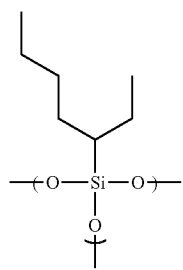 (1-16)
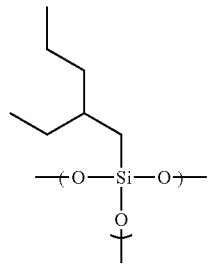 (1-17)
-continued
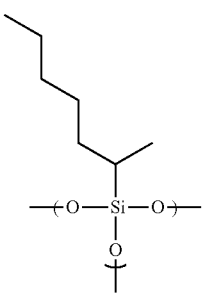 (1-18)
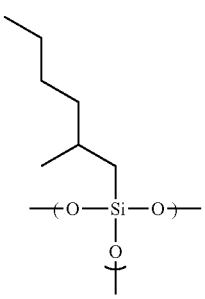 (1-19)
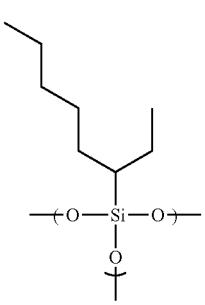 (1-20)
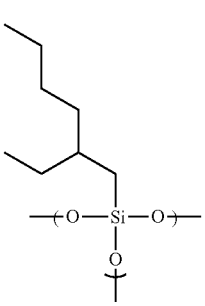 (1-21)
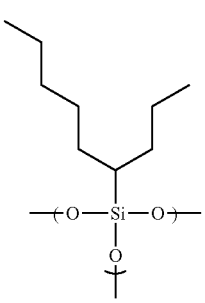 (1-22)

(1-23) 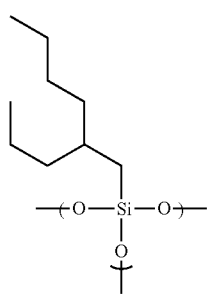

(1-24) 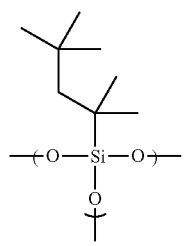

(1-25) 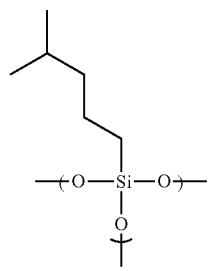

(1-26) 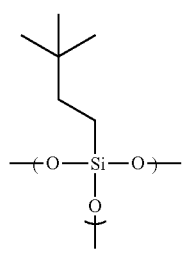

(1-27) 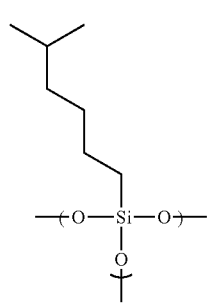

(1-28) 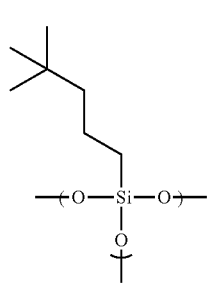

(1-29) 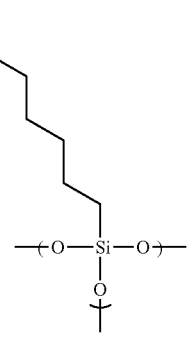

(1-30) 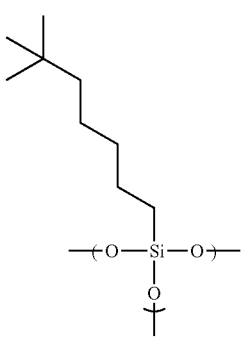

(1-31) 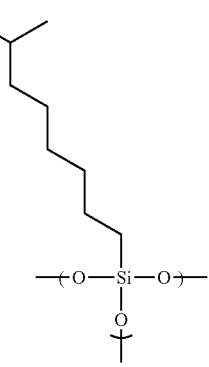

(1-32) 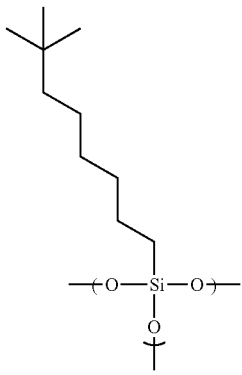

In a coating film obtained using the water/oil-repellent coating composition of the present invention, the second hydrocarbon chain-containing group, a hydroxy group, an alkoxy group, or a group formed via condensation of hydroxy group may be bonded to a silicon atom (second silicon atom) that originates from the metal compound (B) and is different from the silicon atom to which the first hydrocarbon chain-containing group is bonded. The second silicon atom may be replaced by other metal atom (e.g., Al, Fe, In, Ge, Hf, Si, Ti, Sn, Zr or Ta). The second silicon atoms or other metal atoms also behave as a spacer to enhance the water/oil repellency characteristics of the first hydrocarbon chain-containing group since the second hydrocarbon chain-containing group with a carbon number smaller than that of the first hydrocarbon chain-containing group, a hydroxy group, an alkoxy group or a hydroxy group is bonded to the second silicon atoms or other metal atoms.

The carbon number of the alkoxy group is preferably 1 to 4, more preferably 1 to 3. Examples of the alkoxy group include butoxy group, propoxy group, ethoxy group and methoxy group.

The hydroxy group may be condensed with other hydroxy group, an alkoxy group or the like to form —O— group, and such a group formed by condensation of a hydroxy group may be bonded to the metal atoms.

The structure in which the second hydrocarbon chain-containing group or a hydroxy group is bonded to the second silicon atom or other metal atom is preferably a structure (B) represented by the following formula (2).

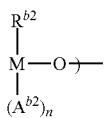

(2)

wherein $R^{b2}$ represents the second hydrocarbon chain-containing group, hydroxy group or —O— group, $A^{b2}$ represents hydroxy group or —O— group, M represents Al, Fe, In, Ge, Hf, Si, Ti, Sn, Zr or Ta, and n represents an integer of 0 to 3 according to the kind of M.

In the formula (2), the second hydrocarbon chain-containing group represented by $R^{b2}$ can be appropriately selected from the groups described above.

$R^{b2}$ is preferably hydroxy group.

In the formula (2), M is preferably a trivalent metal such as Al, a tetravalent metal such as Si, Ti, Sn or Zr, more preferably Al, Si, Ti, Zr, especially preferably Si.

Further, in the formula (2), n represents 1 when M is a trivalent metal such as Al, Fe or In, n represents 2 when M is a tetravalent metal such as Ge, Hf, Si, Ti, Sn or Zr, and n represents 3 when M is a pentavalent metal such as Ta.

Preferable examples of the structure (b) include structures represented by the following formulae (2-1) to (2-11) when M is Si.

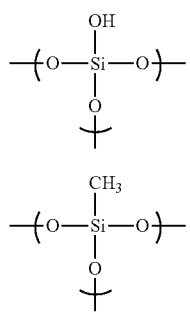

(2-1)

(2-2)

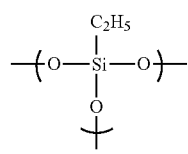

(2-3)

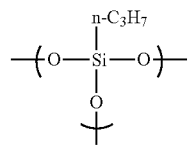

(2-4)

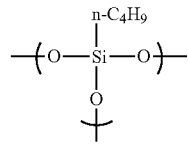

(2-5)

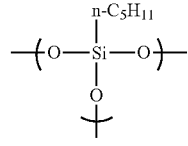

(2-6)

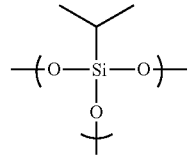

(2-7)

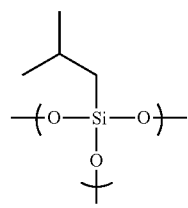

(2-8)

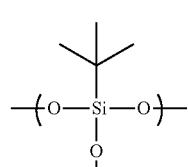

(2-9)

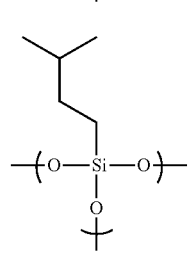

(2-10)

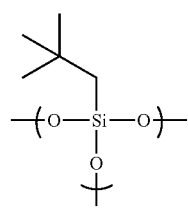

(2-11)

(2-12)

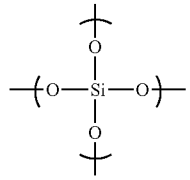

In the resulting coating film, the abundance ratio of the structure (a) to the structure (b) as structure (a)/structure (b) is preferably not less than 0.01, more preferably not less than 0.02, further preferably not less than 0.03, and is preferably not more than 0.3, more preferably not more than 0.2, further preferably not more than 0.1, still more preferably not more than 0.09 in terms of moles.

The thickness of a coating film obtained using the water/oil-repellent coating composition of the present invention is preferably not more than 50 nm, more preferably not more than 40 nm. When the thickness of the coating film is not more than 50 nm, pencil hardness can be increased while abrasion resistance is maintained. The thickness of the resulting coating film is preferably not less than 6 nm. When the thickness of the coating film is not less than 6 nm, the water/oil repellency is effectively exhibited.

The coating film obtained from the water/oil-repellent coating composition of the present invention exhibits excellent hardness. The hardness of the coating film can be evaluated on the basis of, for example, pencil hardness, and is preferably greater than or equal to 2H, more preferably greater than or equal to 4H, further preferably greater than or equal to 7H, and is normally preferably not greater than or equal to 9H.

Further, a coating film obtained using the water/oil-repellent coating composition of the present invention comprises a network-like backbone in which silicon atoms and the metal atoms (preferably only silicon atoms) are bonded via oxygen atoms. The coating film comprises a structure in which the first hydrocarbon chain-containing group is bonded to a part of silicon atoms forming the backbone. Therefore, the coating film exhibits excellent liquid droplet slide behavior and water/oil repellency. The liquid droplet slide behavior can be evaluated using as an index the movement speed of a liquid droplet sliding down over a coating film formed on a smooth substrate that is placed so as to be inclined at a certain angle. In a coating film obtained using the water/oil-repellent coating composition of the present invention, the movement speed of a liquid droplet when a substrate provided with the coating film is inclined at 32° is preferably not less than 5 cm/sec, more preferably not less than 10 cm/sec, further preferably not less than 15 cm/sec. The movement speed of a liquid droplet is described in the following. First, a substrate provided with a coating film is inclined at 32°, and 20 µL of a water droplet is dropped onto the coating film (hereinafter, sometimes referred to as a position (1)). A location (hereinafter, sometimes referred to as a position (2)) to which the liquid droplet slides down by 0.9 cm from the position (1) is defined as a starting point, and the time required for movement to a location (hereinafter, sometimes referred to as a position (3)) to which the liquid droplet slides down by 3 cm from the starting point is measured. The movement distance as 3 cm between the position (2) and the position (3) is divided by the time required for sliding-down from the position (2) to the position (3), thereby determining the movement speed of the liquid droplet.

The coating film of the present invention is formed by coating the water/oil-repellent coating composition on the substrate. The substrate may be in the form of a flat surface or a curved surface, or may have a three-dimensional structure in which a large number of surfaces are combined. The substrate may be formed of an organic material or an inorganic material. Examples of the organic material include thermoplastic resins such as acrylic resin, polycarbonate resin, polyester resin, styrene resin, acryl-styrene copolymer resin, cellulose resin, polyolefin resin and polyvinyl alcohol resin; and thermosetting resins such as phenol resin, urea resin, melamine resin, epoxy resin, unsaturated polyester, silicone resin and urethane resin. Examples of the inorganic material include ceramics; glass; metals such as iron, silicon, copper, zinc and aluminum; and alloys including the above metals.

The substrate may be subjected to an easy adhesion treatment beforehand. Examples of the adhesion treatments include hydrophilization treatments such as a corona treatment, a plasma treatment and an ultraviolet-ray treatment. A primer treatment with a resin, a silane coupling agent, a tetraalkoxysilane or the like may also be employed. By providing a primer layer between a water-repellent film and a substrate by the primer treatment, durability such as moisture resistance and alkali resistance can be further improved.

The primer layer is preferably a layer formed using an under-layer forming composition containing a component (P) capable of forming a siloxane backbone.

The primer layer is preferably a layer formed using an under-layer forming composition containing a component (P1) composed of a compound represented by the following formula (III), and/or a partial hydrolysis condensation product thereof.

$$\text{Si}(X^{P2})_4 \qquad \qquad (\text{III})$$

wherein each of $X^{P2}$ represents a halogen atom, an alkoxy group or isocyanate group.

In the formula (III), $X^{P2}$ is preferably a chlorine atom, an alkoxy group with a carbon atom number of 1 to 4, or isocyanate group, and four $X^{P2}$s are preferably the same.

Specifically, $Si(NCO)_4$, $Si(OCH_3)_4$, $Si(OC_2H_5)_4$ or the like is preferably used as the compound represented by the general formula (III) (hereinafter, sometimes referred to as a compound (III)). In the present invention, the compounds (III) may be used singly, or used in combination of two or more thereof.

The component (P1) contained in the primer layer forming composition may be a partial hydrolysis condensation product of the compound (III). The partial hydrolysis condensation product of the compound (III) can be obtained by applying a general hydrolysis condensation method using an acid or base catalyst. The degree of condensation (degree of polymerization) of the partial hydrolysis condensation product is required to be a degree which allows a product to be dissolved in a solvent. The component (P1) may be the compound (III), or a partial hydrolysis condensation product of the compound (III), or may be a mixture of the compound (III) and a partial hydrolysis condensation thereof, for example, a partial hydrolysis condensation product of the compound (III) containing an unreacted part of the compound (III). As the compound represented by the general formula (III) or the partial hydrolysis condensation product, a commercial product is available, and such a commercial product can be used in the present invention.

The under-layer forming composition may be a composition containing the component (P1), and a component (P2)

composed of a compound represented by the following formula (IV) (hereinafter, referred to as a compound (IV)) and/or a partial hydrolysis condensation product thereof, or a composition containing a partial hydrolysis co-condensation product of the component (P1) and component (P2) (which may contain the component (P1) and/or the compound (IV)).

$$X^{P3}{}_3Si-(CH_2)_p-SiX^{P3}{}_3 \quad (IV)$$

wherein each of $X^{P3}$ represents a hydrolyzable group or hydroxy group, and p is an integer of 1 to 8.

The compound (IV) is a compound having a hydrolyzable silyl group or silanol group at both ends of a divalent organic group.

Examples of the hydrolyzable group represented by $X^{P3}$ in the formula (IV) include the same group or atom as $X^{P2}$. $X^{P3}$ is preferably an alkoxy group or isocyanate group, especially preferably an alkoxy group from the viewpoint of stability of the compound (IV) and ease of hydrolysis. The alkoxy group is preferably an alkoxy group with a carbon atom number of 1 to 4, more preferably methoxy group or ethoxy group. These groups are appropriately selected according to the purpose, use and the like in production. A plurality of $X^{P3}$ existing in the compound (IV) may be the same or different, and is preferably the same from the viewpoint of easy availability.

Specific examples of the compound (IV) include $(CH_3O)_3SiCH_2CH_2Si(OCH_3)_3$, $(OCN)_3SiCH_2CH_2Si(NCO)_3$, $Cl_3SiCH_2CH_2SiCl_3$, $(C_2H_5O)_3SiCH_2CH_2Si(OC_2H_5)_3$, $(CH_3O)_3SiCH_2CH_2CH_2CH_2CH_2CH_2Si(OCH_3)_3$, or the like. In the present invention, the compounds (IV) may be used singly, or used in combination of two or more thereof.

The component contained in the primer layer forming composition may be a partial hydrolysis condensation product of the compound (IV). The partial hydrolysis condensation product of the compound (IV) can be obtained by the same method as described in the production of the partial hydrolysis condensation product of the compound (III). The degree of condensation (degree of polymerization) of the partial hydrolysis condensation product is required to be a degree which allows a product to be dissolved in a solvent. The component (P) may be the compound (IV), or the partial hydrolysis condensation product of the compound (III), or may be a mixture of the compound (IV) and a partial hydrolysis condensation thereof, for example a partial hydrolysis condensation product of the compound (IV) containing an unreacted part of the compound (IV).

As the compound represented by the general formula (IV) or the partial hydrolysis condensation product, a commercial product is available, and such a commercial product can be used in the present invention.

For the under-layer, various kinds of polysilazanes capable of forming an oxide film mainly composed of silicon, which is similar to the compound (III), may be used.

The primer layer forming composition normally contains an organic solvent in addition to a solid as a layer forming component in consideration of economic efficiency, workability and ease of controlling the thickness of the obtained primer layer. The organic solvent is not particularly limited as long as it is capable of dissolving a solid contained in the primer layer forming composition. Examples of the organic solvent include the same compounds as in the water-repellent film forming composition. The organic solvent is not limited to one kind of solvent, and two or more solvents different in polarity, vaporization rate and so on may be mixed and used.

When the primer layer forming composition contains a partial hydrolysis condensation product and a partial hydrolysis co-condensation product, the primer layer forming composition may contain a solvent used for producing these condensation products.

Further, it is preferable that for accelerating a hydrolysis co-condensation reaction, a catalyst such as an acid catalyst which is similar to one that is generally used in a partial hydrolysis condensation reaction is blended even in a primer layer forming composition which does not contain a partial hydrolysis condensation product and a partial hydrolysis co-condensation product. In the case where the primer layer forming composition contains a partial hydrolysis condensation product and a partial hydrolysis co-condensation product, a catalyst is preferably blended when a catalyst used in these condensation products does not remain in the composition.

The under-layer forming composition may contain water for carrying out a hydrolysis condensation reaction and hydrolysis co-condensation reaction of the contained component.

As a method for forming an under-layer using the primer layer forming composition, a known method with an organosilane compound-based surface treatment agent can be used. For example, the under-layer forming composition can be applied to a surface of a base by a method such as brush coating, flow coating, rotation coating, immersion coating, squeeze coating, spray coating or hand coating, dried as necessary in the air or a nitrogen atmosphere, and then cured to form the under-layer. Conditions for curing are appropriately controlled according to the kind, concentration and the like of a composition to be used.

Curing of the primer layer forming composition may be performed concurrently with curing of a water-repellent film forming composition.

The thickness of the primer layer is not particularly limited as long as it ensures that moisture resistance, adhesion and barrier property to an alkali etc. from the substrate can be imparted to a water-repellent film formed on the primer layer.

Using the water/oil-repellent coating composition of the present invention, the coating film is obtained that attains both water/oil repellency and hardness, and the coating film is useful for a substrate in display devices such as touch panel displays, optical elements, semiconductor elements, building materials, automobile components, nanoimprint techniques, solar cell members and so on. The water/oil-repellent coating composition of the present invention is suitably used for articles such as bodies, window glass (windshield, side glass and rear glass), mirrors and bumpers in transportation equipment such as trains, automobiles, watercrafts and aircrafts. The water/oil-repellent coating composition can also be used in outdoor applications such as building outer walls, tents, solar cell power generation modules, sound insulating boards and concrete. The water/oil-repellent coating composition can also be used in fishing nets, bug catching nets and water tanks. Further, the water/oil-repellent coating composition can also be used in various kinds of indoor equipment such as articles of members around kitchens, bathrooms, washbasins, mirrors and toilets, chandeliers, potteries such as tiles, artificial marbles, and air conditioners. Further, the water/oil-repellent coating composition can also be used for antifouling treatment of tools, inner walls, pipes and so on in factories. The water/oil-repellent coating composition is also suitable for goggles, glasses, helmets, pinball games, fibers, umbrellas, play equipment, soccer balls and so on. Further, the water/oil-repellent coating composition can also be used as a deposition preventing agent for various kinds of packaging materials such as food packaging materials, cosmetic packaging materials and interiors of pots.

The present application claims the benefit of priority to Japanese patent application No. 2014-223649 filed on Oct. 31, 2014. The entire contents of the specification of Japanese patent application No. 2014-223649 filed on Oct. 31, 2014 are incorporated herein by reference.

EXAMPLES

The present invention is hereinafter described in more detail in the following by way of Examples, however, the present invention is not limited to the following Examples, and modifications which do not depart from the spirit and scope of the present invention are allowed and embraced within the technical scope of the present invention. Hereinafter, "part" and "%" mean "part by mass" and "% by mass", respectively, unless otherwise noted.

Measurement methods used in examples of the present invention are as follows.

Measurement of Liquid Droplet Slide Behavior

A substrate provided with a coating film by coating the substrate with a water/oil-repellent coating composition was inclined at 32°, 20 μL of water was dropped onto the substrate, and the movement speed of the liquid droplet was measured. Specifically, a liquid droplet was dropped onto the coating film (position (1)). A location (position (2)) to which the liquid droplet slid down by 0.9 cm from the position (1) was defined as a starting point, and the time required for movement to a location (position (3)) to which the liquid droplet slid down by further 3 cm from the starting point was measured. The movement distance (3 cm) between the position (2) and the position (3) was divided by the time (seconds) required for sliding-down from the position (2) to the position (3), thereby determining the movement speed of the liquid droplet.

Measurement of Abrasion Resistance

A steel wool tester (manufactured by Daiei Seiki Co., Ltd.) was used. An eraser (MONO ONE DUST CATCH manufactured by Tombow Pencil Co., Ltd.) was brought into contact with the coating film under a load of 500 g, an abrasion test was conducted at a rate of 40 r/m in, and the number of abrasion times until the contact angle was −15° or less with respect to the initial contact angle was counted. The maximum number of abrasion times is set to 1500, and a sample with a contact angle of −15° or less even after 1500 times is evaluated as having abrasion resistance (O).

Measurement of Thickness

The thickness of the coating film was measured using a non-contact-type surface shape measuring instrument (VertScan manufactured by Ryoka Systems Inc.).

Measurement of Contact Angle

The contact angle of a coating film surface to water was measured by a liquid droplet method (liquid amount: 3.0 μL) using a contact angle meter (DM 700 manufactured by Kyowa Interface Science Co., LTD.).

Example 1

Eighty-four parts of ethanol as a solvent (C) and 60 parts of hydrochloric acid (0.01 mol/L aqueous solution) as a catalyst were mixed with 2.8 parts (0.01 parts by mol) of octyltriethoxysilane as an organosilicon compound (A) and 41.7 parts (0.20 parts by mol) of tetraethyl orthosilicate (tetraethoxysilane) as a metal compound (B), and the mixture was stirred at room temperature for 24 hours to obtain a water/oil-repellent coating composition. The obtained water/oil-repellent coating composition was applied onto a glass substrate ("EAGLE XG" manufactured by Corning Incorporated) by spin coating under the condition of a rotation number of 3000 rpm and 20 sec using a spin coater manufactured by MIKASA Corporation, and then dried to obtain a coating film.

Examples 2 to 4 and Comparative Examples 1 to 3

A coating film was obtained in the same procedure as in Example 1 except that the kinds and use amounts of the organosilicon compound (A), the metal compound (B) and the solvent (C) were as shown in Table 1.

The contact angle to water, and the thickness, the abrasion resistance and the liquid droplet slide behavior for each of the obtained coating films are shown in Table 1.

|  |  |  |  |  | Examples | | | | Comparative Examples | | |
|---|---|---|---|---|---|---|---|---|---|---|---|
|  |  |  |  |  | 1 | 2 | 3 | 4 | 1 | 2 | 3 |
| Film production | Component | Organosilicon compound (A) | Octyltriethoxysilane (276.49 g/mol) | Parts by mol | 0.01 | 0.01 |  |  | 0.01 | 0.01 |  |
|  |  |  |  | Parts | 2.8 | 2.8 |  |  | 2.8 | 2.8 |  |
|  |  |  | Decyltriethoxysilane (304.54 g/mol) | Parts by mol |  |  | 0.01 | 0.01 |  |  | 0.01 |
|  |  |  |  | Parts |  |  | 3.0 | 3.0 |  |  | 3.0 |
|  |  | Metal compound (B) | Tetraethoxysilane (208.33 g/mol) | Parts by mol | 0.20 | 0.48 | 0.187 | 0.354 | 0.04 | 0.08 | 0.04 |
|  |  |  |  | Parts | 41.7 | 100.0 | 39.0 | 73.7 | 8.3 | 16.7 | 9.2 |
|  |  | Solvent (C) | Ethanol | Parts | 84 | 193.6 | 81.4 | 146.2 | 22.0 | 37.9 | 25 |
|  |  | Catalyst | 0.01 mol/L Hydrochloric acid | Parts | 60.0 | 137.0 | 55.0 | 102.0 | 13.5 | 24.0 | 15 |
| Physical property | Contact angle (water) |  |  | ° | 106.2 | 107.0 | 109.1 | 108.8 | 105.2 | 106.8 | 108.2 |
|  | Thickness |  |  | nm | 16.5 | 200 | 280 | 205.0 | 316 | 225 | 327 |
|  | Abrasion resistance |  |  | Times | ○ | ○ | ○ | ○ | <100 | 300 | <100 |
|  | Slide behavior (movement speed of the liquid droplet. water 20 μm) |  |  | cm/sec | 23.1 | 21.2 | 23.4 | 22.2 | 24.6 | 23.1 | 14.17 |

The results described above show that a coating film attaining both water/oil repellency and abrasion resistance can be obtained using the water/oil-repellent coating composition of the present invention.

INDUSTRIAL APPLICABILITY

Using the water/oil-repellent coating composition of the present invention, the water/oil-repellent coating composition the coating film attaining both water/oil repellency and abrasion resistance is obtained, and is useful for fields in display devices such as touch panel displays, optical elements, semiconductor elements, building materials, automobile components, nanoimprint techniques, solar cell members and so on.

The invention claimed is:

1. A water/oil-repellent coating composition comprising an organosilicon compound (A), a metal compound (B), and a solvent (C), wherein at least one first hydrocarbon chain-containing group and at least one hydrolyzable group are bonded to a silicon atom in the organosilicon compound (A), wherein at least one hydrolyzable group is bonded to a metal atom in the metal compound (B), wherein a second hydrocarbon chain-containing group having a length shorter than the length of the first hydrocarbon chain-containing group may be bonded to the metal atom in the metal compound (B), wherein the first hydrocarbon chain-containing group is a hydrocarbon group, wherein the hydrocarbon group has a carbon number of not less than 7 and not more than 17, wherein a molar ratio of the metal compound (B) to the organosilicon compound (A) as metal compound (B)/organosilicon compound (A) is not less than 18 and not more than 48, and wherein the solvent (C) is methanol, ethanol, propanol, or butanol.

2. The water/oil-repellent coating composition according to claim 1, wherein the molar ratio of the metal compound (B) to the organosilicon compound (A) as metal compound (B)/organosilicon compound (A) is not less than 18 and not more than 36.

3. The water/oil-repellent coating composition according to claim 1, wherein the organosilicon compound (A) is represented by formula (I) below:

[Chemical Formula 1]

wherein $R^a$ represents the first hydrocarbon group, each of $A^{a1}$ independently represents a hydrolyzable group, $Z^{a1}$ represents the first hydrocarbon chain-containing group, the second hydrocarbon chain-containing group having a length shorter than a length of the first hydrocarbon chain-containing group, or a hydrolyzable group, $R^a$ and $Z^{a1}$ may be the same or different when $Z^{a1}$ is the first hydrocarbon chain-containing group, $Z^{a1}$ and $A^{a1}$ may be the same or different when $Z^{a1}$ is the hydrolyzable group, and $R^a$ and $Z^{a1}$ may be the same or different when the water/oil-repellent coating composition comprises a plural number of formulae (I).

4. The water/oil-repellent coating composition according to claim 1, wherein the metal compound (B) is represented by formula (II) below:

[Chemical Formula 2]

wherein $R^{b1}$ represents the second hydrocarbon chain-containing group or the hydrolyzable group, each of $A^{b1}$ independently represents a hydrolyzable group, M represents Al, Fe, In, Ge, Hf, Si, Ti, Sn, Zr or Ta, and m represents an integer of 1 to 4 according to a kind of metal atom.

5. The water/oil-repellent coating composition according to claim 4, wherein $R^{b1}$ and $A^{b1}$ represent the same group in the formula (II).

6. The water/oil-repellent coating composition according to claim 4, wherein M represents Si in the formula (II).

* * * * *